United States Patent
Vu et al.

(10) Patent No.: US 8,290,916 B2
(45) Date of Patent: Oct. 16, 2012

(54) RULE-BASED RECORD PROFILES TO AUTOMATE RECORD DECLARATION OF ELECTRONIC DOCUMENTS

(75) Inventors: Bao Q. Vu, Costa Mesa, CA (US); Jeffrey Lynn Wallace, Costa Mesa, CA (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 12/500,371

(22) Filed: Jul. 9, 2009

(65) Prior Publication Data

US 2011/0010348 A1 Jan. 13, 2011

(51) Int. Cl.
 *G06F 15/16* (2006.01)
 *G06F 17/20* (2006.01)
(52) U.S. Cl. ................................................ 707/694
(58) Field of Classification Search ............. 707/694
 See application file for complete search history.

(56) References Cited

U.S. PATENT DOCUMENTS

| | | |
|---|---|---|
| 7,076,501 B2 | 7/2006 | Ahmadi |
| 7,233,959 B2 | 6/2007 | Kanellos et al. |
| 2004/0205635 A1 | 10/2004 | Pratte |
| 2005/0216379 A1 | 9/2005 | Ozaki et al. |
| 2006/0143464 A1 | 6/2006 | Ananthanarayanan et al. |
| 2006/0230044 A1 | 10/2006 | Utiger |
| 2006/0259468 A1 | 11/2006 | Brooks et al. |
| 2007/0053611 A1 | 3/2007 | Wnek |
| 2007/0088736 A1 | 4/2007 | DeBie |
| 2007/0179939 A1* | 8/2007 | O'Neil et al. ................. 707/4 |
| 2008/0154956 A1 | 6/2008 | DeBie |
| 2008/0155652 A1 | 6/2008 | DeBie |

OTHER PUBLICATIONS

Bill Neale, "FileNet: Best Practices in Deploying Records Manager" http://armanebraska.com/documents/BILLNEALEISO15489.ppt.
Jeffrey Wallace, "FileNet: Record Activator Design Guide", Jun. 2, 2005.

* cited by examiner

*Primary Examiner* — Jean M Corrielus
*Assistant Examiner* — Alex Gofman
(74) *Attorney, Agent, or Firm* — Patterson & Sheridan, LLP

(57) ABSTRACT

According to one embodiment of the present invention, a method for automatic record declaration is provided. The method includes providing a plurality of record profiles including information that uniquely defines how a new record is to be declared. A plurality of mapping definitions are provided including a set of rules to select a particular record profile, each mapping definition being associated with only one document class. A new document is received and the set of rules applied to the new document until a matching record profile is found. The matching record profile is used to declare a new record for the new document.

20 Claims, 3 Drawing Sheets

RULE-BASED RECORD PROFILES TO AUTOMATE RECORD DECLARATION OF ELECTRONIC DOCUMENTS

BACKGROUND

The present invention relates to record content management, and more specifically, to the automation of record declaration of electronic documents in content management systems.

Content management systems facilitate managing a variety of information/content (documents) and processes that use such information. Electronic document, as used herein, refer to any identifiable logical/physical units of information, including content and transactions generated by an enterprise. An electronic document may comprise an electronic file, object, program, database, image, email, message, etc. Documents stored in the content management system may not initially be managed as part of a records management system until they go through a "declaration" procedure. Once declared as a record, a document may be managed or accessed via the content management system and access to the declared document will take place via the content management system.

SUMMARY

According to one embodiment of the present invention, a method comprises: providing a plurality of record profiles including information that uniquely defines how a new record is to be declared; providing a plurality of mapping definitions including a set of rules to select a particular record profile, each mapping definition being associated with only one document class; receiving a new document; applying the set of rules to the new document until a matching record profile is found; and using the matching record profile to declare a new record for the new document.

According to another embodiment of the present invention, a method comprises: providing a plurality of record profiles including information than can uniquely define how a new record is to be declared; providing a plurality of mapping definitions including a set of rules to select a particular record profile, each mapping definition being associated with only one document class; receiving a new document; applying the set of rules to the new document to locate a matching record profile is found; and using the matching record profile to declare a new record for the new document, wherein if no matching record profile is found, launching a pre-defined workflow to allow for manual record profile selection.

According to a further embodiment of the present invention, a system comprises: a record profile configuration user interface; a set of record profiles generated by the record profile configuration user interface; a mapping definition configuration user interface; a set of mapping definitions generated by the mapping definition configuration user interface; a content engine event handler receiving a new document and applying at least one of the mapping definitions to the new document to select one of the record profiles to be associated with the new document; and a new record declaration unit for using the selected record profile to declaration a new record for the new document.

According to a further embodiment of the present invention, a system comprises: a record profile configuration user interface; a set of record profiles generated by the record profile configuration user interface; a mapping definition configuration user interface; a set of mapping definitions generated by the mapping definition configuration user interface; a content engine event handler receiving a new document and applying at least one of the mapping definitions to the new document to select one of the record profiles to be associated with the new document; and a new record declaration unit for using the selected record profile to declare a new record for the new document.

According to another embodiment of the present invention, a computer program product for automatic record declaration comprises: a computer usable medium having computer usable program code embodied therewith, the computer usable program code comprising: computer usable program code configured to: provide a plurality of record profiles including information that uniquely defines how a new record is to be declared; provide a plurality of mapping definitions including a set of rules to select a particular record profile, each mapping definition being associated with only one document class; receive a new document; apply the set of rules to the new document until a matching record profile is found; and use the matching record profile to declare a new record for the new document.

DETAILED DESCRIPTION

Embodiments of the invention provide a content management system with automated record declaration of electronic documents using rule-based record profiles. One example of a content management system is the FileNet® P8 Record Manager (RM) system. FileNet® is a trademark or registered trademark of International Business Machines Corporation in the United States, other countries, or both. Currently, the FileNet® P8 RM product provides two mechanisms that support semi-/fully-automated record declaration of electronic documents. One of these is a workplace declaration template that supports semi-automatic declaration by providing fixed and default values for various aspects of record declaration (record property values, filing locations, etc.). However, use of such a template typically still requires user intervention to complete, both in the selection of a particular template to use and in the processing of the template itself.

Another mechanism provided by the FileNet® P8 RM product is an example Declaration Content Engine (CE) Event Handler that can be assigned to applicable document classes to automatically declare a record for a new document/document version at check-in time. However, this Event Handler must typically be customized before use and is limited to fixed record class and filing location(s).

Embodiments of the invention provide a more automated record declaration process that is driven by characteristics of the underlying document itself (document class, document property values, document filing location, etc.). The use of a record profile and its automatic selection has been previously implemented in the FileNet® P8 Capture product line and may be used also in the FileNet® P8 Email Manager.

In accordance with embodiments of the invention, a pre-defined "record profile" is automatically selected by a rules-based engine driven by rule mapping definitions. The selected record profile is then used to declare a new record that becomes the security proxy for the document. As used herein the term "single record profile" means a collection of information that can be used to uniquely and completely define how a new record is to be declared.

The following discussion relates to embodiments of the invention which are adapted to be used in conjunction with the FileNet® P8 RM product. However, the teachings of the invention may be applied to other record management systems.

Figure 1:
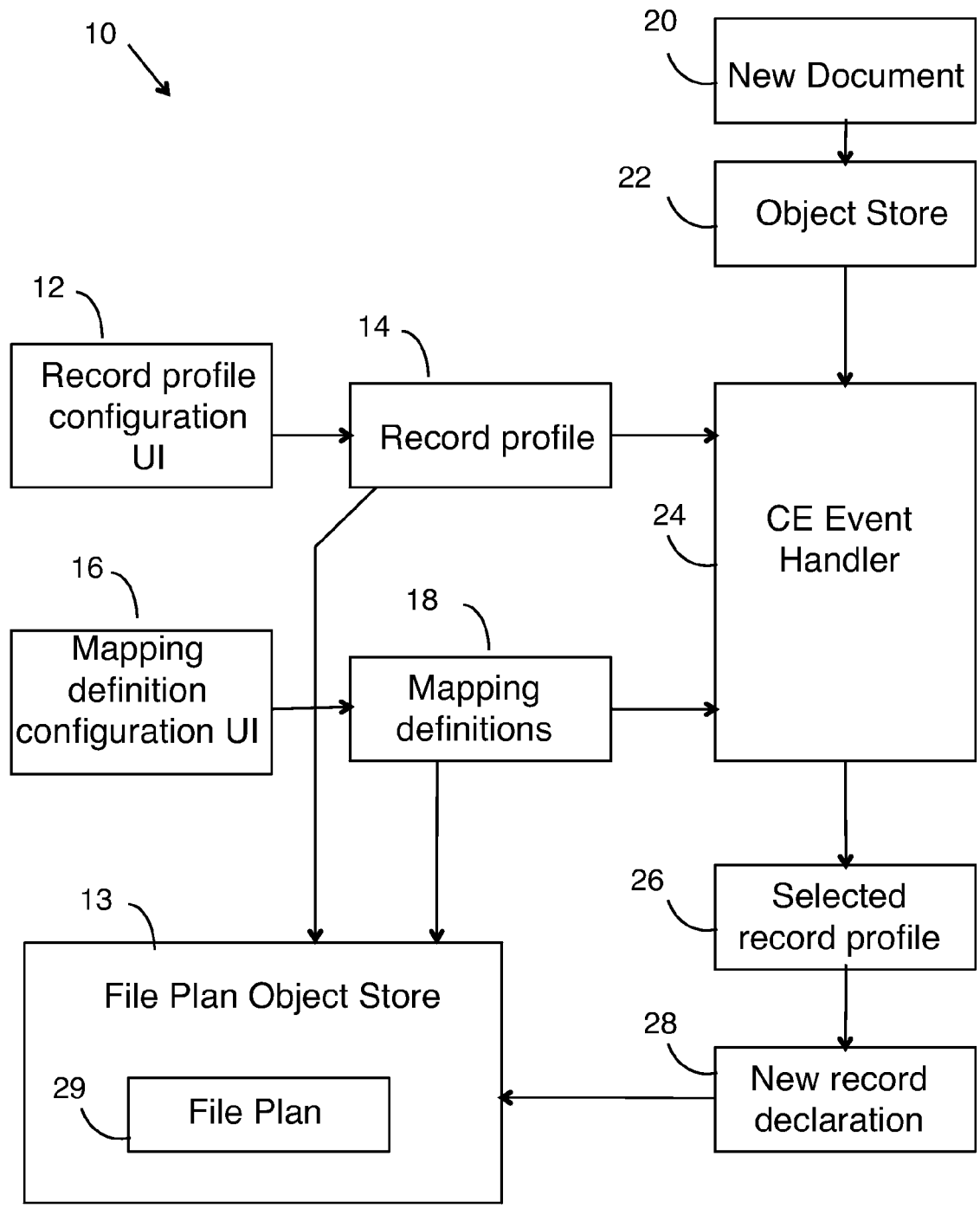
FIG. 1 shows a diagram of a system for automating record declaration in a record management system in accordance with an embodiment of the invention.

Referring to FIG. 1 there is shown a diagram of a system 10 for automating record declaration in a record management system in accordance with an embodiment of the invention. A record profile configuration user interface (UI) 12 may be used by a user to create and maintain record profiles 14. A file plan object store unit 13 stores the record profiles 14. Record profiles 14 may include: a name to identify the record profile; a descriptive text string (optional); the symbolic name of a particular record class to use during declaration; one or more default property values to assign to the properties of the record class (optional); one or more file plan locations into which the record is to be filed; and a Boolean flag to provide for the automatic transfer of document property values to matching record property values based upon property symbolic name. Each record profile is persisted using a custom CE object class and is contained within a well-known RM folder location on each file plan object store.

A mapping definition UI 16 provides for the creation and maintenance of mapping definitions 18. The file plan object store 13 stores the mapping definitions 18. A mapping definition provides a set of rules that are used at document check-in time to select a particular record profile instance to use to declare a new record for the associated document. A particular mapping definition is associated with one, and only one, document class. In particular, the mapping definition may include the following items: a name to identify the mapping definition; a descriptive text string (optional); the symbolic name of the document class that this mapping definition applies to; and an ordered set of rules each of which is associated with a particular record profile. At execution time, this ordered set of rules is applied one-at-a-time to the document in question until a successful match is found. An optional "any" match rule can be included at the end of this ordered set to act as the default record profile mapping rule in the event that no higher rule match occurs. This "any" match rule may also provide for the more coarse-grained document class to record profile mapping.

As a new document 20 is checked into an object store 22, a CE event handler 24, which has been subscribed to each document class check-in event, applies the rules defined by the mapping definition 18 associated with the new document's document class to select a particular record profile 26. The selected record profile 26 is then used to automatically declare a new record 28 for the document. The new record 28 is stored in a file plan 29 in the file plan object store 13.

One advantage of this embodiment of the rules-based record profile system 10 is that it provides automatic record declaration while still providing a degree of automatic adaptability based upon each individual document.

Each individual rule in the mapping definitions 18 is a combination of logical operations on specific property values of the document being processed at check-in time. This is similar to the WHERE clause of an SQL statement. For example, the rule: (PublicationDate BETWEEN (1/1/2000, 3/31/2000)) AND (DocumentTitle CONTAINS ('invoice')) could be associated with a pre-defined record profile named "2000Q1Invoices" that defines records filed into the appropriate volume of an Accounting department's record folder for first quarter 2000 invoice documents. The type of "operator" applicable to a given document property is primarily depended upon the data type of that property. The following are some example operators per data type:

| String | == (case-sensitive/-insensitive), !=, <, <=, >, >=, SUBSTRING |
|---|---|
| Numeric | ==, !=, <, <=, >, >= |
| Date | ==, !=, BEFORE, BETWEEN, AFTER |
| ChoiceList/MarkingSet | ==, !=, IN(...) |
| Boolean | IS_TRUE, IS_FALSE |
| all types | IS_NULL, IS_NOT_NULL |

An alternative embodiment of the invention would provide that, in the case that no record profile was successfully automatically selected, a pre-defined workflow could be launched to allow for manual record profile selection.

Figure 2:
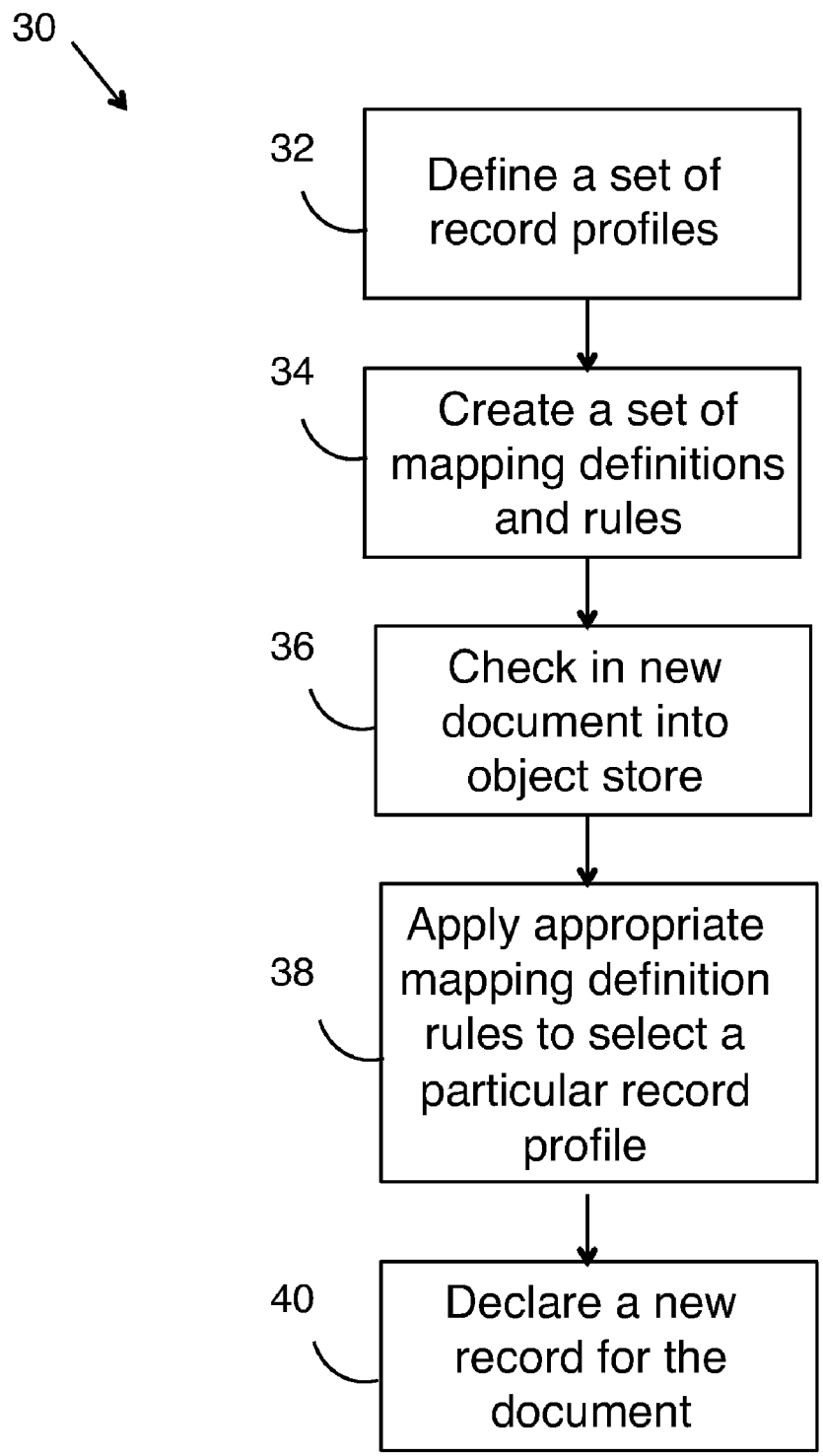
FIG. 2 shows a diagram of a flowchart for the automated declaration of records in a record management system in accordance with an embodiment of the invention.

FIG. 2 shows a diagram of a flowchart of a process 30 for the automated declaration of records in a record management system in accordance with an embodiment of the invention. In block 32, a set of record profiles are defined. This may be accomplished using the record profile configuration UI 12 shown in FIG. 1. A set of mapping definitions and rules are then created, in block 34. This may be accomplished using the mapping definition configuration UI 16, shown in FIG. 1. In block 36, a new document is checked into the object store. The appropriate mapping definition rules are then applied to select a particular record profile, in block 38. For example, this step may be accomplished by the CE event handler 24 shown in FIG. 1. In block 40, a new record is declared for the document.

As can be seen from the above disclosure, embodiments of the invention provide systems, methods, and computer program products for automating record declaration of electronic documents using rule-based record profiles. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. Other examples of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, and/or RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
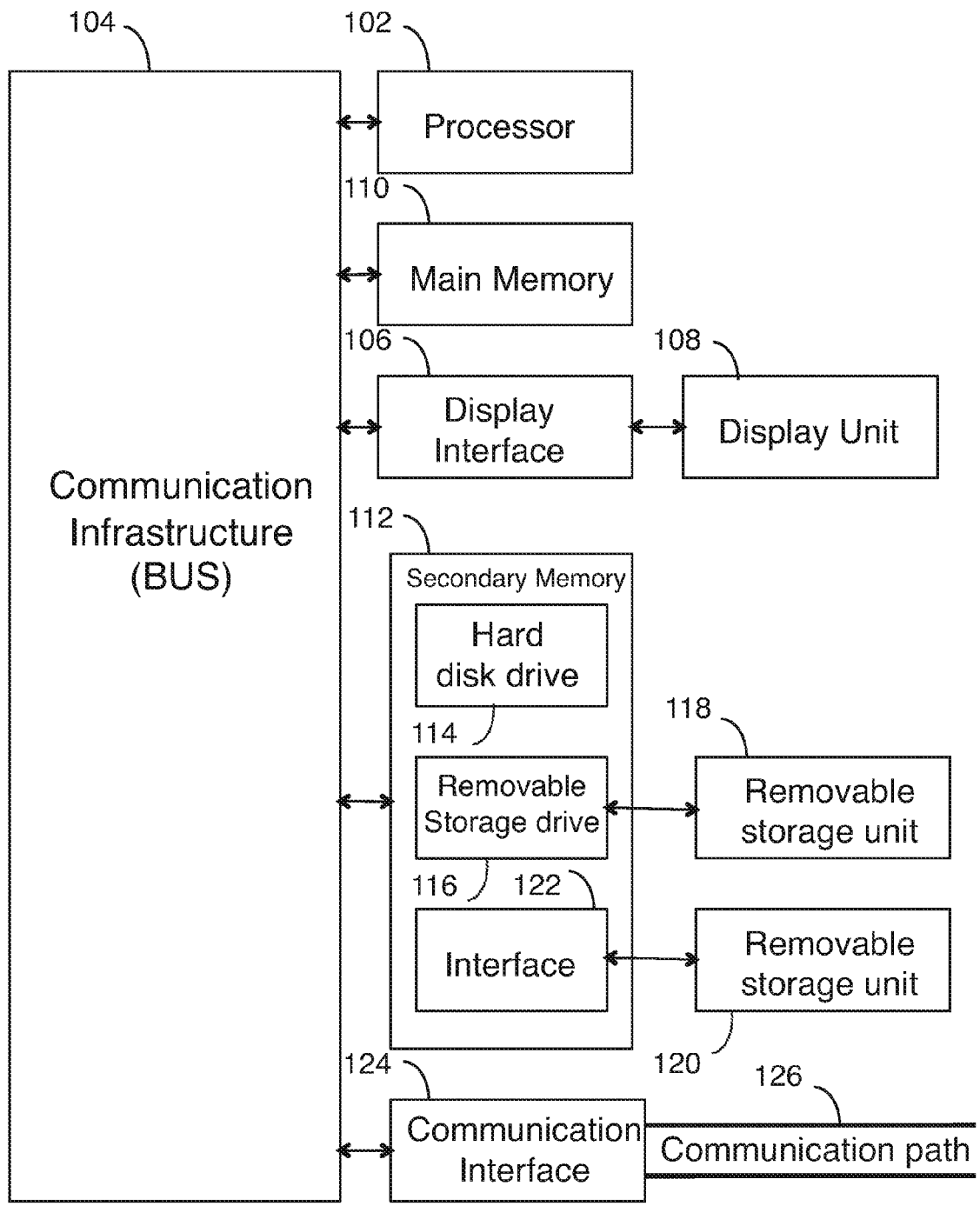
FIG. 3 shows a high level block diagram of an information processing system useful for implementing one embodiment of the present invention.

FIG. 3 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    providing a plurality of record profiles including information that uniquely defines how a new record is to be declared;
    providing a plurality of mapping definitions including an ordered set of rules to select a particular one of said plurality of record profiles, each mapping definition being associated with a respective one of a plurality of document classes, wherein each rule in said ordered set of rules corresponds to a respective one of said plurality of record profiles and comprises a combination of logical operations that are applied to specific property values of a new document that has been checked into an object store, wherein each mapping definition further includes a match rule at the end of said ordered set of rules that is a default record profile mapping rule corresponding to a default record profile in said plurality of record profiles, and wherein said match rule is satisfied in the event that no match occurs for any of the other rules in said set of ordered rules;
    transmitting one or more subscription requests for check-in events for said plurality of document classes to an object store event manager, wherein said object store event manager transmits a check-in event whenever a document belonging to one of said plurality of document classes is checked into said object store;
    receiving a check-in event specifying that a new document from one of said plurality of document classes has been checked into said object store;
    automatically determining a matching record profile to use in declaring a new record for said new document by applying, by operation of one or more computer processors, said ordered set of rules to said new document until said matching record profile is found; and
    using said matching record profile to automatically declare a new record for said new document without any user interaction.

2. The method according to claim 1, wherein said providing a plurality of record profiles comprises providing record profiles including a symbolic name of a record class, a file plan location and a flag to provide for the automatic transfer of document property values to matching record property values.

3. The method according to claim 2, wherein said providing a plurality of record profiles comprises storing an electronic record associated with said record profile.

4. The method according to claim 3, wherein said providing a plurality of record profiles comprises providing a name to identify said record profile and a descriptive text string describing said record profile.

5. The method according to claim 4, wherein said providing a plurality of record profiles comprises providing at least one default property values to assign to the properties of said record class.

6. The method according to claim 2, wherein said flag provides for the automatic transfer of document property values to matching record property values based on said property symbolic name.

7. The method according to claim 1, wherein providing a plurality of mapping definitions includes providing a name to identify said mapping definition and a descriptive text string.

8. The method according to claim 7, wherein providing a plurality of mapping definitions includes providing a symbolic name of said document class that said mapping definition applies to.

9. The method according to claim 7, wherein providing a plurality of mapping definitions includes applying said ordered set of rules one at a time to said new document until a successful match is found.

10. A method comprising:
    providing a plurality of record profiles including information than can uniquely define how a new record is to be declared;
    providing a plurality of mapping definitions including an ordered set of rules to select a particular one of said plurality of record profiles, each mapping definition being associated with a respective one of a plurality of document classes, wherein each rule in said ordered set of rules corresponds to a respective one of said plurality of record profiles and comprises a combination of logical operations that are applied to specific property values of a new document that has been checked into an object store, wherein each mapping definition further includes a match rule at the end of said ordered set of rules that is a default record profile mapping rule corresponding to a default record profile in said plurality of record profiles, and wherein said match rule is satisfied in the event that no match occurs for any of the other rules in said set of ordered rules;

transmitting one or more subscription requests for check-in events for said plurality of document classes to an object store event manager, wherein said object store event manager transmits a check-in event whenever a document belonging to one of said plurality of document classes is checked into said object store;

receiving a check-in event specifying that a new document from one of said plurality of document classes has been checked into said object store;

automatically determining a matching record profile to use in declaring a new record for said new document by applying, by operation of one or more computer processors, said ordered set of rules to said new document until said matching record profile is found; and upon determining that no matching record profile could be found, launching a pre-defined workflow to allow for manual record profile selection.

11. The method according to claim 10, further comprising applying said ordered set of rules one at a time to said new document until a successful match is found.

12. A system comprising:
a processor; and
a memory containing a program configured for execution on the processor, the program comprising:
a record profile configuration user interface;
a set of record profiles generated by said record profile configuration user interface;
a mapping definition configuration user interface;
a set of mapping definitions generated by said mapping definition configuration user interface definitions, wherein each mapping definition in the set of mapping definitions includes an ordered set of rules to select a particular one of said plurality of record profiles, each mapping definition being associated with a respective one of a plurality of document classes, wherein each rule in said ordered set of rules corresponds to a respective one of said plurality of record profiles and comprises a combination of logical operations that are applied to specific property values of a new document that has been checked into an object store, wherein each mapping definition further includes a match rule at the end of said ordered set of rules that is a default record profile mapping rule corresponding to a default record profile in said plurality of record profiles, and wherein said match rule is satisfied in the event that no match occurs for any of the other rules in said set of ordered rules;
a content engine event handler configured to transmit one or more subscription requests for check-in events for said plurality of document classes to an object store event manager, wherein said object store event manager transmits a check-in event whenever a document belonging to one of said plurality of document classes is checked into said object store and further configured to receive a check-in event specifying that a new document from one of said plurality of document classes has been checked into said object store, and further to automatically apply at least one of said mapping definitions to said new document to select one of said record profiles to be associated with said new document; and
a new record declaration unit for using said selected record profile to automatically declarate a new record for said new document without any user interaction.

13. The system according to claim 12 further comprising at least one file plan location into which said new record is to be filed.

14. The system according to claim 12 further comprising a Boolean flag for the automatic transfer of document property values to matching record property values.

15. The system according to claim 12 further comprising a predefined workflow to allow for manual record profile selection in cases where said content engine event handler is unable to select a record profile to associate with said new document.

16. A system comprising:
a processor; and
a memory containing a program configured for execution on the processor, the program comprising:
a record profile configuration user interface;
a set of record profiles generated by said record profile configuration user interface;
a mapping definition configuration user interface;
a set of mapping definitions generated by said mapping definition configuration user interface, wherein each mapping definition in the set of mapping definitions includes an ordered set of rules to select a particular one of said plurality of record profiles and is associated with a respective one of a plurality of document classes, wherein each rule in said ordered set of rules corresponds to a respective one of said plurality of record profiles and comprises a combination of logical operations that are applied to specific property values of a new document that has been checked into an object store, wherein each mapping definition further includes a match rule at the end of said ordered set of rules that is a default record profile mapping rule corresponding to a default record profile in said plurality of record profiles, and wherein said match rule is satisfied in the event that no match occurs for any of the other rules in said set of ordered rules;
a content engine event handler configured to transmit one or more subscription requests for check-in events for said plurality of document classes to an object store event manager, wherein said object store event manager transmits a check-in event whenever a document belonging to one of said plurality of document classes is checked into said object store and further configured to receive a check-in event specifying that a new document from one of said plurality of document classes has been checked into said object store, and further to automatically apply at least one of said mapping definitions to said new document to select one of said record profiles to be associated with said new document; and
a new record declaration unit for using said selected record profile to declare a new record for said new document.

17. The system according to claim 16 further comprising a record management system for receiving said new record declaration.

18. The system according to claim 17 wherein said record management system is a FileNet system.

19. A computer program product for automatic record declaration, said computer program product comprising:

a computer-readable storage medium having computer usable program code embodied therewith, said computer usable program code comprising:

computer usable program code which, when executed by operation of one or more computer processors, is configured to:

provide a plurality of record profiles including information that uniquely defines how a new record is to be declared;

provide a plurality of mapping definitions including a set of rules to select a particular record profile, wherein each mapping definition in the set of mapping definitions includes an ordered set of rules to select a particular one of said plurality of record profiles and is associated with a respective one of a plurality of document classes, wherein each rule in said ordered set of rules corresponds to a respective one of said plurality of record profiles and comprises a combination of logical operations that are applied to specific property values of a new document that has been checked into an object store, wherein each mapping definition further includes a match rule at the end of said ordered set of rules that is a default record profile mapping rule corresponding to a default record profile in said plurality of record profiles, and wherein said match rule is satisfied in the event that no match occurs for any of the other rules in said set of ordered rules;

transmitting one or more subscription requests for check-in events for said plurality of document classes to an object store event manager, wherein said object store event manager transmits a check-in event whenever a document belonging to one of said plurality of document classes is checked into said object store;

receive a check-in event specifying that a new document from one of said plurality of document classes has been checked into said object store;

automatically determine a matching record profile to use in declaring a new record for said new document by applying, by operation of one or more computer processors, said ordered set of rules to said new document until said matching record profile is found; and use said matching record profile to automatically declare a new record for said new document without any user interaction.

20. The computer program product according to claim 19 wherein said computer usable program code is further configured to apply said ordered set of rules one at a time to said new document until a successful match is found.

* * * * *